July 8, 1969
B. A. CROWE ET AL
3,453,928
METHOD OF MAKING TUBULAR SEAMLESS LACE
Filed Dec. 4, 1967
Sheet 1 of 8
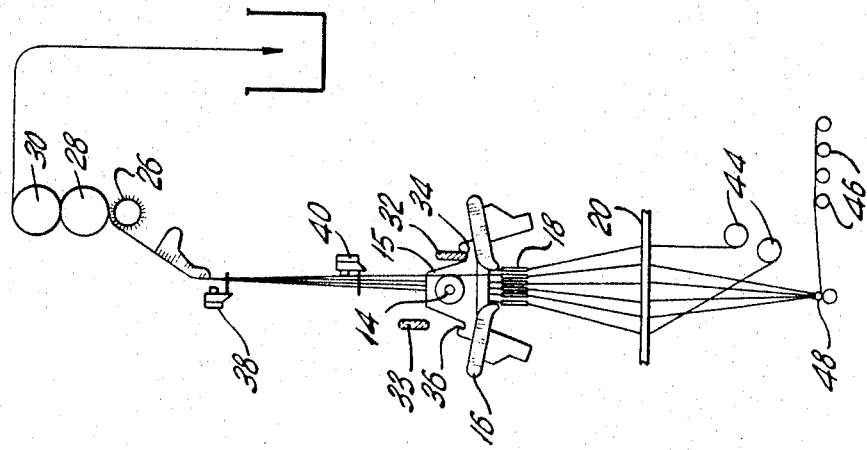
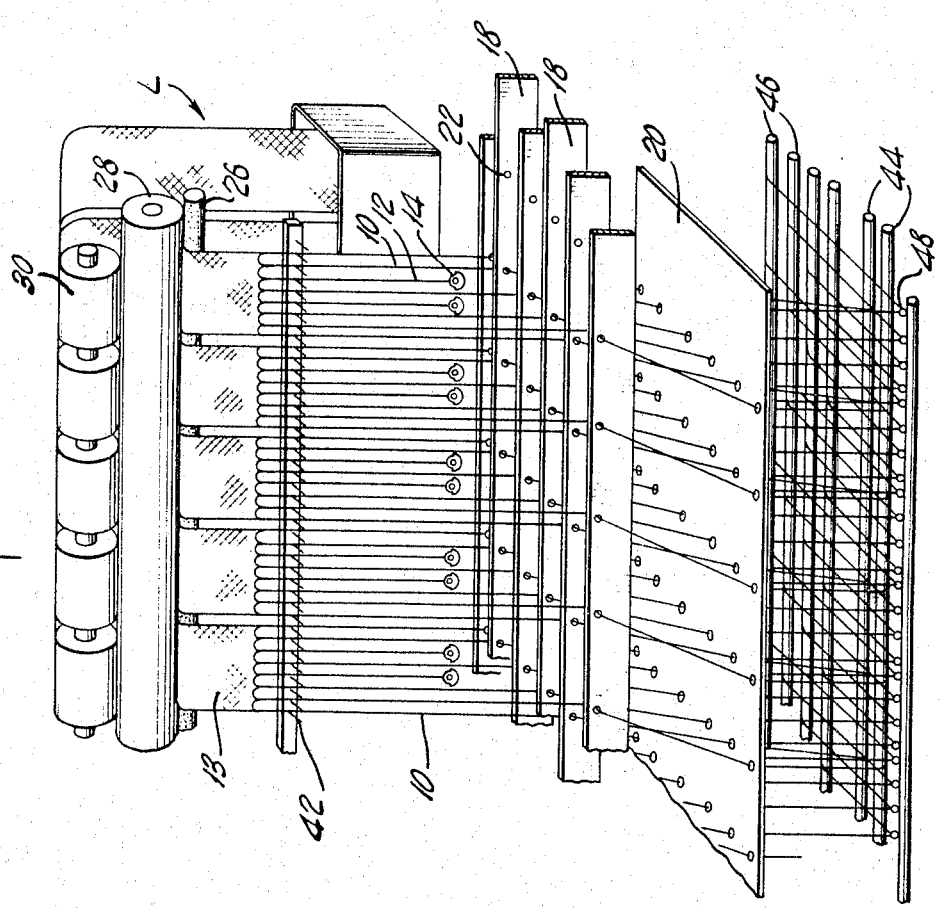
INVENTORS
BYRON A. CROWE
ROBERT S. CORP
BY
Nolte & Nolte
ATTORNEYS July 8, 1969  B. A. CROWE ET AL  3,453,928
METHOD OF MAKING TUBULAR SEAMLESS LACE
Filed Dec. 4, 1967

INVENTORS
BYRON A. CROWE
ROBERT S. CORP
BY
Nolte & Nolte
ATTORNEYS

July 8, 1969  B. A. CROWE ET AL  3,453,928
METHOD OF MAKING TUBULAR SEAMLESS LACE
Filed Dec. 4, 1967  Sheet 3 of 8
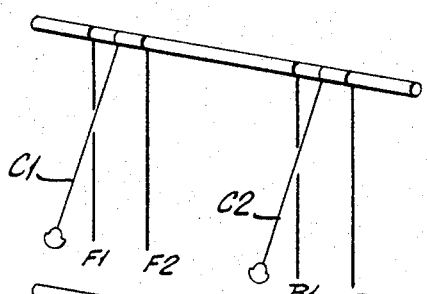
Fig. 7.
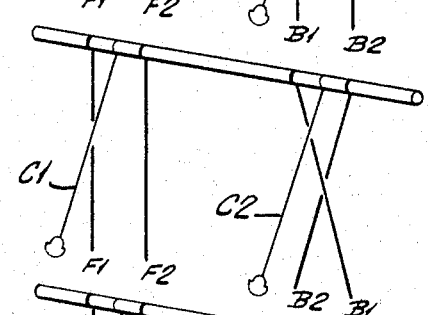
Fig. 8.
Fig. 9.
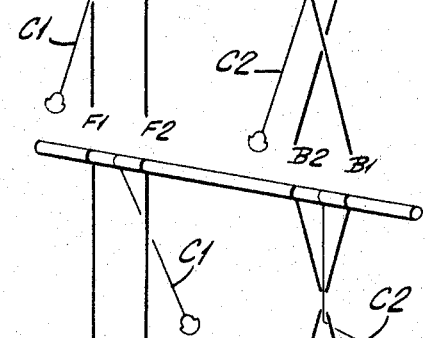
Fig. 10.
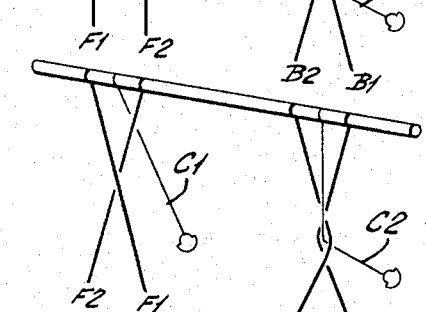
Fig. 11.
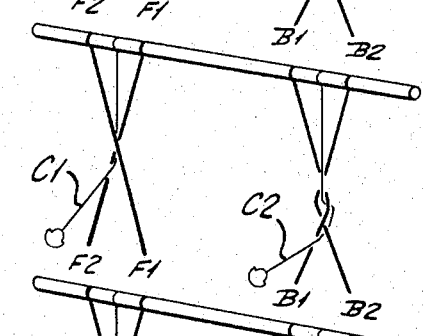
Fig. 12.
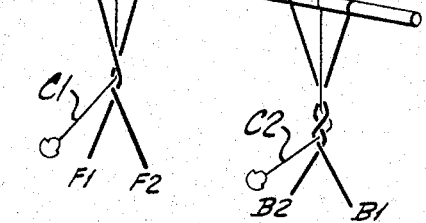
INVENTORS
BYRON A. CROWE
ROBERT S. CORP
BY
Nolte & Nolte
ATTORNEYS

FRONT OVER BACK PORTION

JOIN BACK TO FRONT

United States Patent Office 3,453,928
Patented July 8, 1969

3,453,928
METHOD OF MAKING TUBULAR
SEAMLESS LACE
Byron A. Crowe and Robert S. Corp, Coventry, R.I., assignors to Wildwood Company, Coventry, R.I., a corporation of Rhode Island
Filed Dec. 4, 1967, Ser. No. 687,849
Int. Cl. D04c 1/06, 5/06; D04b 21/00
U.S. Cl. 87—4
8 Claims

ABSTRACT OF THE DISCLOSURE

A method of making a tubular seamless lace on a flatbed lace-making machine from warp and bobbin threads in conformity with a predetermined pattern, in which a first group of warp threads is assigned to the front portion of the tubular lace and a second group of warp threads to the back portion thereof. The warp threads of the second group are crossed and the warp threads of the first group are decrossed upon imparting a front motion to the bobbin threads. Thereafter, a back motion is imparted to the bobbin threads whereby the same may freely pass through the warp threads of the first group and engage the crossed warp threads of the second group at their respective points of intersection. Subsequently, the warp threads of the first group are crossed in conformity with a pattern and the warp threads of the second group are decrossed. Upon front motion of the bobbin threads the same becomes twisted around the warp threads of the second group and engage the crossed warp threads of the first group at their respective points of intersection. These steps are repeated any desired number of times in conformity with the pattern.

Background of the invention

The present invention relates to machine-made tubular goods made from textile materials, and more particularly relates to tubular lace material, and to a method of making such tubular lace on a flat-bed Leavers lace machine.

Still more particularly, the invention relates to a method of and an apparatus for making improved seamless lace hosiery of the open-net fancy type fashionable today.

It is an object of the present invention to provide a new type of stocking that can be produced at relatively low cost and in a relatively simple manner without requiring complex machinery.

It is another object of the present invention to provide a method of making open mesh tubular goods on a flat-bed Leavers lace making machine without requiring complicated heretofore necessary procedures for joining the flat lace into a tubular body by a seam.

A still further object of the present invention consists in the provision of a method of making tubular goods from textile fabrics, especially, stockings, gloves, leotards and the like, on a flat-bed Leavers lace machine directly, without requiring any subsequent method steps for transforming the flat lace into a tubular stocking, glove, leotard, etc.

These and other objects and advantages of the invention, will appear more clearly from the following specification in connection with the accompanying drawing, in which:

FIG. 1 is a diagrammatic front view showing the essential parts of a Leavers lace machine;

FIG. 2 is a side view of the machine of FIG. 1;

Figure 13:
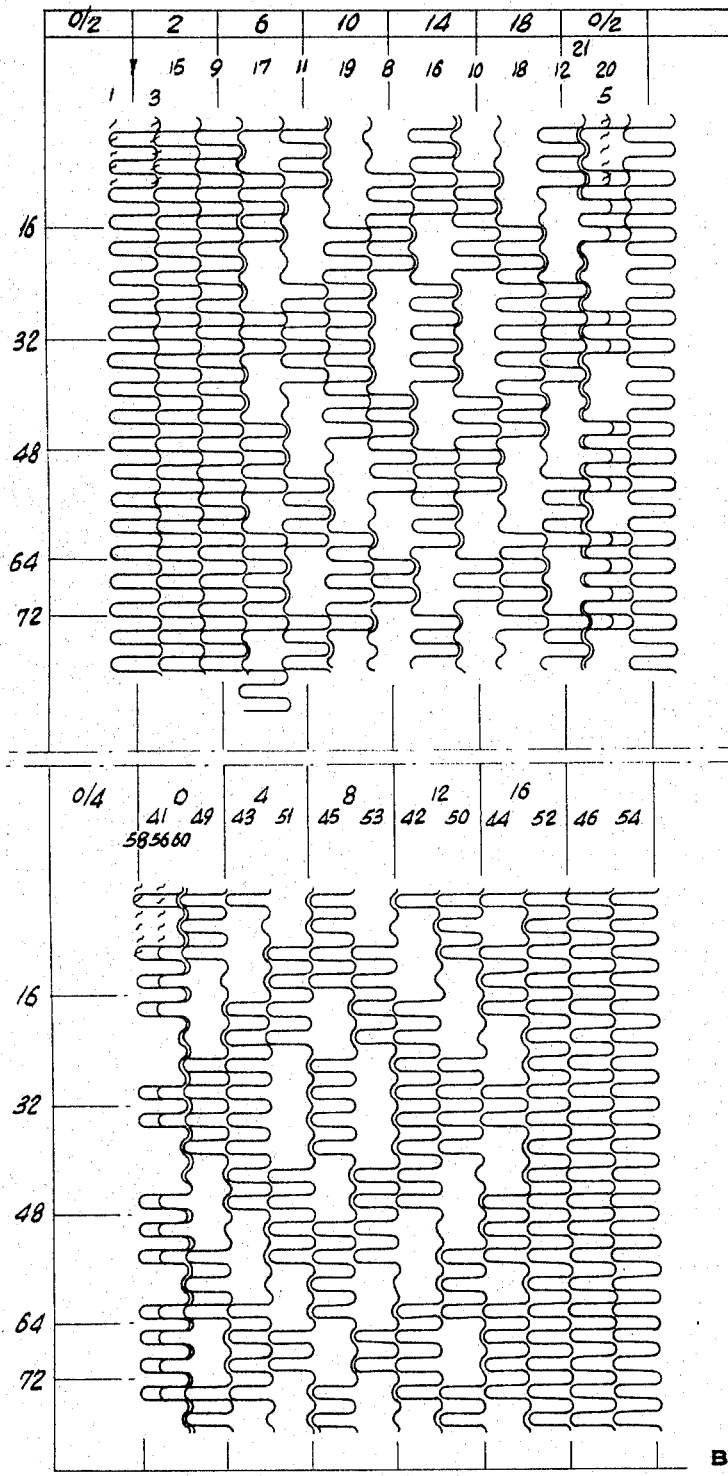

FIGS. 7 to 12 diagrammatically illustrate successive steps in the formation of the front and back portions of a tubular fabric;

FIG. 13 shows a pattern for use in the production of a lace stocking, the lower part of the figure showing the front and the upper part showing the back of the stocking.

Figure 14:
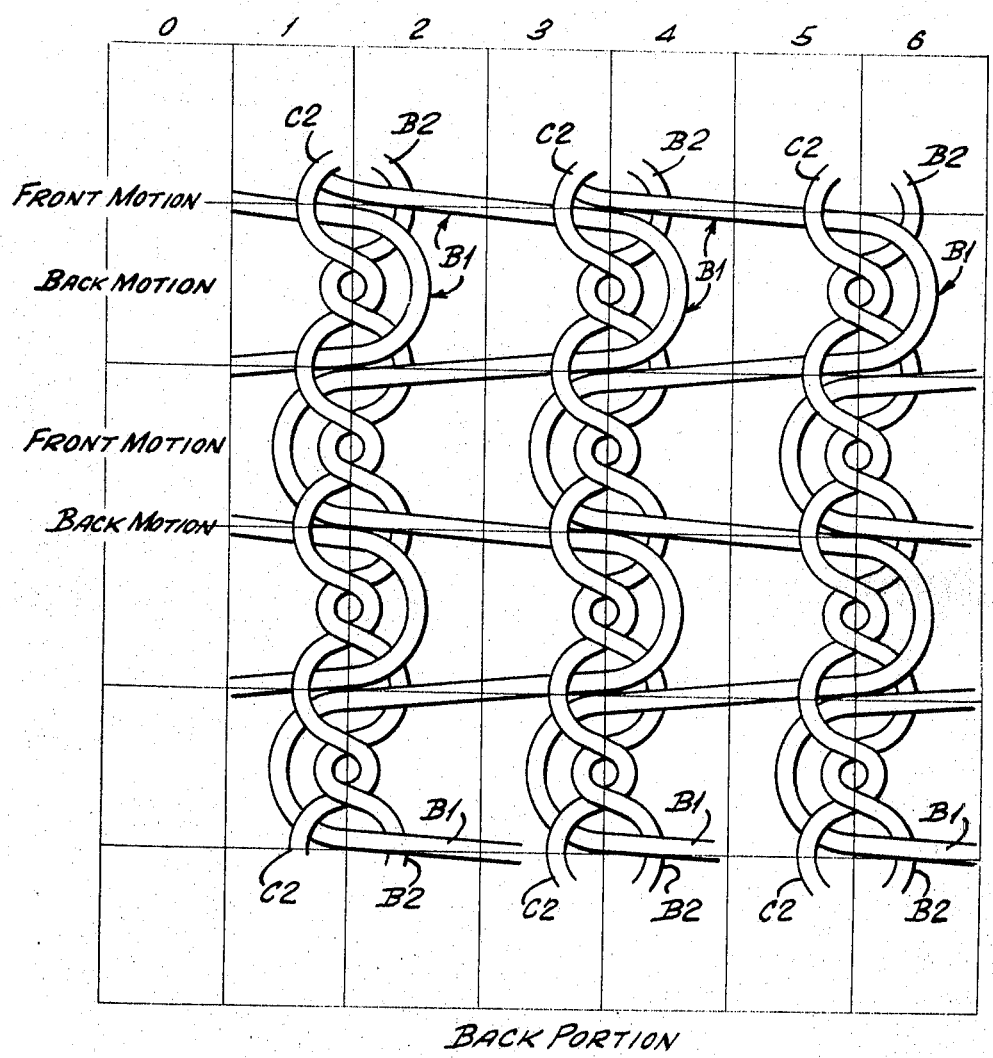
Figure 15:
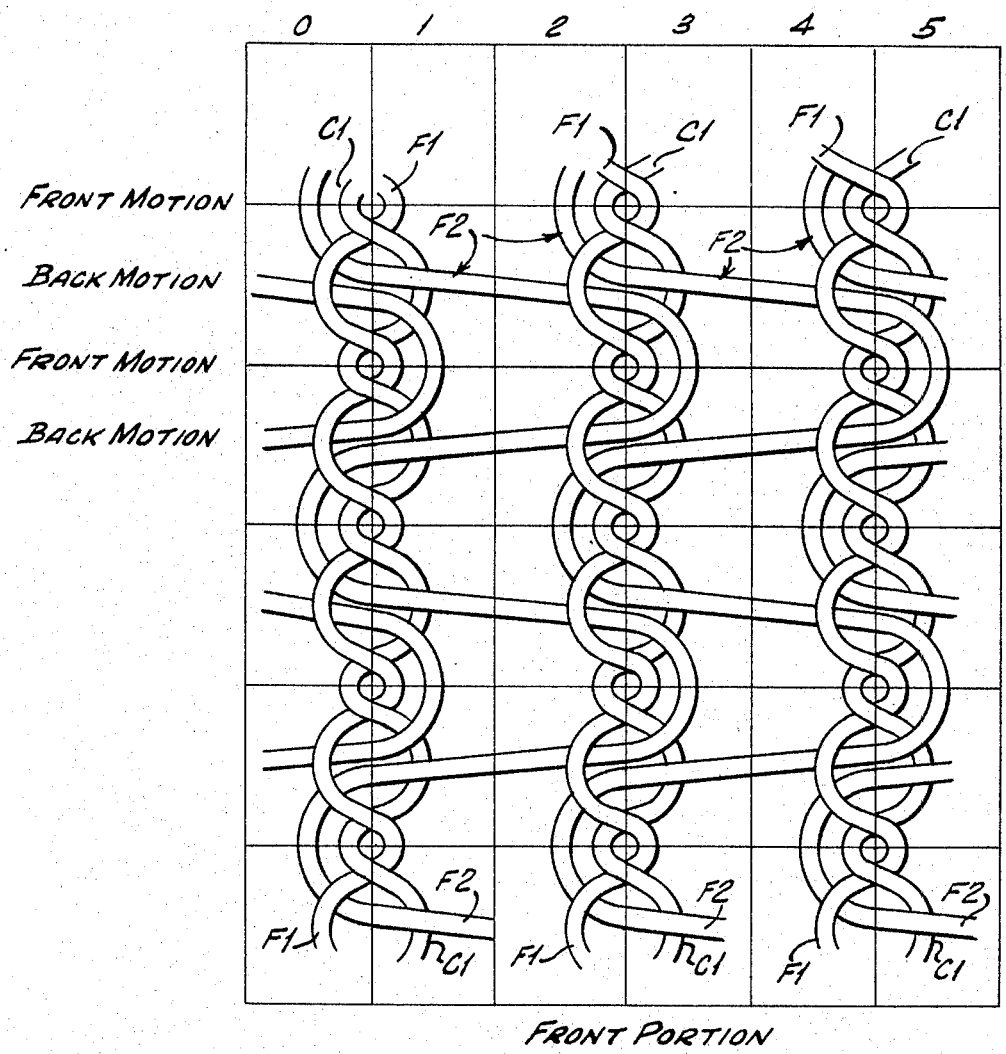
Figure 16:
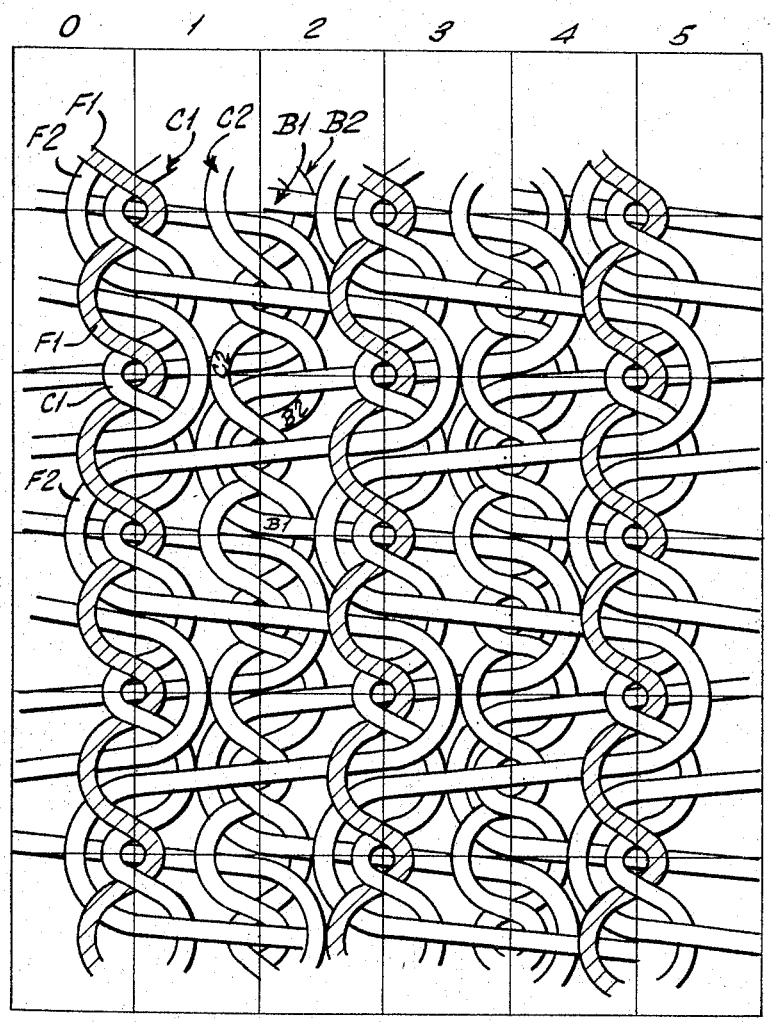
Figure 17:
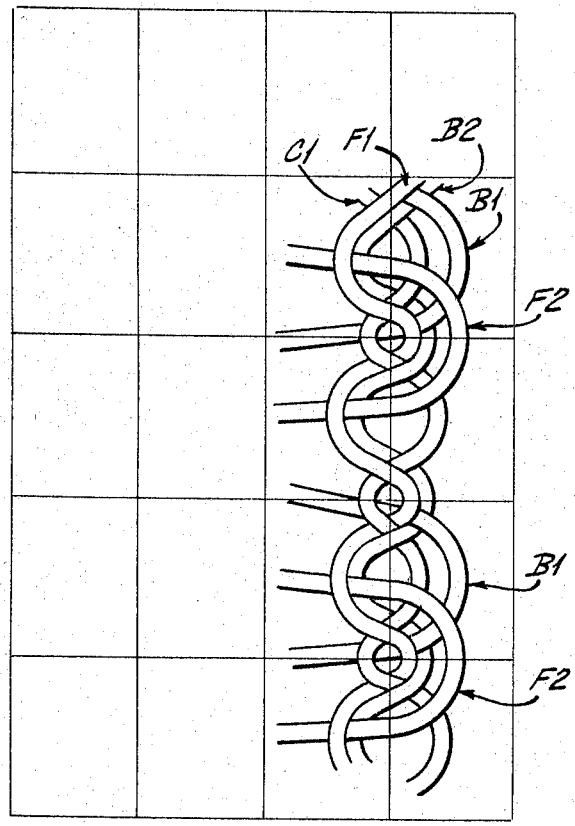

FIGS. 14 to 17 show in detail how the threads of the front and back portion of a tubular stocking according to the program of FIG. 13 is made; FIGS. 14 and 15 respectively showing the back and front portion of the stocking; FIG. 16 showing the combination of the front over the back portion and FIG. 17 the portion where the front joins the back portion.

Detailed description of a preferred embodiment of the invention

In order to understand the new method of producing the new seamless lace tubular goods according to the present invention, for instance, stockings on a Leavers lace machine, the essential parts of the Leavers lace machine have been illustrated diagrammatically in FIGS. 1 and 2. Other parts less essential to the operation of the machine have only been mentioned, but are not illustrated since those skilled in the art are very well acquainted with the various parts of a Leavers lace machine.

The lace stocking is produced concurrently by the movements and intertwisting of two sets of threads, warp and beam threads on one hand and bobbin threads on the other hand. As is very well known, bobbins 14 in carriages 15 carry bobbin threads 12 and swing like pendulums through the warp threads always in the same path and are guided in slots of so-called combs 16. For reasons of simplicity only three bobbin heads 12 per stocking 13 are shown in FIG. 1, it being understood, however, that there is one bobbin thread 13 each between two adjacent warp or beam threads 10. Warp threads 10 are threaded through steel bars 18 (six being shown in FIG. 1) which are actuated by a Jacquard mechanism to be described later, and which may move either to the right or to the left, with regard to FIG. 1. The direction and distance of movement of bars 18 is determined by the design or pattern of the particular goods to be produced and more specifically, by the program layed out by the designer of the pattern. One example of such a program will be described in connection with FIG. 13.

The Leavers lace machine, generally designated L, also comprises a sley 20 running the full length of the machine and consisting of a wire screen rubbed with a mixture of soap and lamp black to fill the holes in the screen. It is then painted over with a solution of black varnish to impart hardness and durability to the screen, and pricked for purposes of threading the warp and beam threads 10 therethrough in conformity with the pattern to be produced. Sley 20 is placed slightly to one side of the center of the machine, this displacement being provided to form an angle and to cause the threads 10 to rub against one side of the holes in steel bars 18 to prevent the threads from floating in the holes. This, of course, would occur if the threads were passed through the holes perpendicularly to sley 20.

Figures 3, 4:
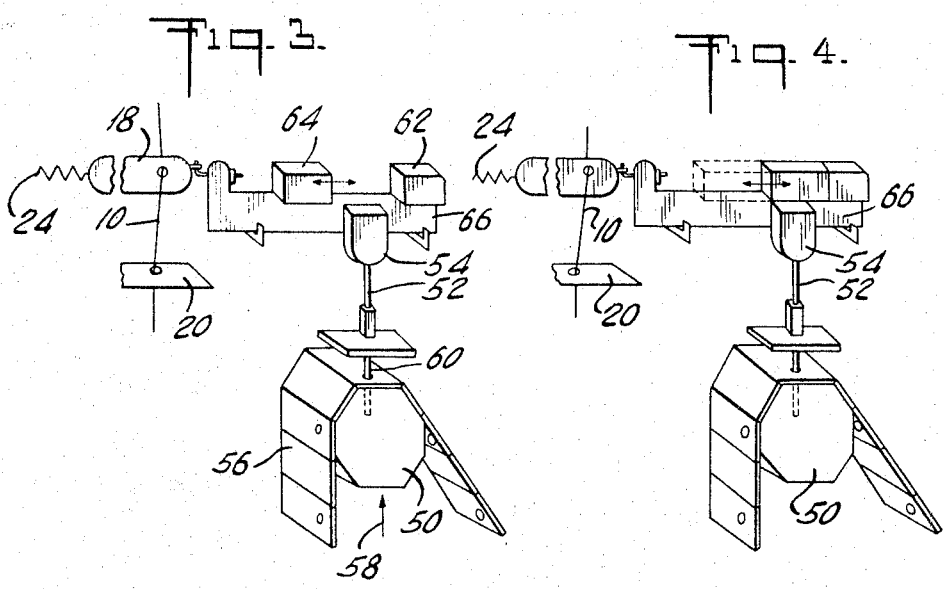
FIGS. 3 to 6 illustrate successive movements of the Jacquard of the Leavers lace machine of FIGS. 1 and 2.

Steel bars 18 have about the thickness of a piece of paper and are separated from each other by a thin metal guide in order to make sure that they are able to move freely back and forth. Steel bars 18 are perforated with small holes 22 for passage of the warp and beam threads therethrough and extend throughout the length of the machine and beyond at each end. The left hand ends of steel bars 18, are attached to individual spiral springs 24 (FIGS. 3 and 6) which are held to the frame of the machine L, while the right hand ends of bars 18 are connected to the draw bits of the Jacquard mechanism of the lace machine. Each bar 18 is threaded with warp or beam threads passing vertically through the bars 18 into the space between the two comb bars 16. Incidentally, all threads in any one individual steel bar act in the same manner throughout the whole width of the machine.

The warp threads 10 are under tension while the threads 12 wound on bobbins 14 in carriages 15 are suspended from the work roller 26. Catch bars 32, 33 (diagrammatically illustrated in FIG. 2) respectively fall into nibs 34, 36 of all carriages 15. One catch bar 33 is arranged at the front, and the other (32) at the back of warp threads 10. These catch bars 32 and 33 have a forward and backward, and an up and down movement imparted upon them. The forward and backward movement alternately pushes and pulls the carriages 15 through the warp and beam threads 10 after the guide bars 18 have been moved by the Jacquard. The front catch bar 33 takes the carriages 15 and draws them up to the combs 16 to the extreme limit of their movement, and returning, pushes them to the center of the gap between the comb bars 16. At the back of warp threads 10, the other catch bar 32 is waiting and falls into the nibs 34 of carriages 15 while, at the same time, the front catch bar 33 rises and releases carriages 15, thereby allowing the catch bar 32 to draw carriages 15 up to their extreme limit toward the back of the machine. The carriages 15 have a short period of rest at the extremities of their forward and backward movement, and this pause enables the Jacquard to actuate safely and to move the guide bars 18 into their proper position.

Above carriages 15 there are two long point bars 38 and 40, one at the front and one at the back of the machine. Bars 38 and 40 carry so-called point-leads with needle-like points 42 corresponding in number per inch to the number of bobbin threads 12 per inch. After each forward or backward movement the points pass through the warp, beam and bobbin threads as soon as they have been crossed, compress the twists and lift them to engage the work already finished adjacent roller 26.

Warp beams 44 are arranged below sley 20 and extend over the length of the machine. Moreover, the machine comprises independent beams 46 placed behind warp beams 44. The warp threads 10 pass directly to sley 20 and from there through guide bars 18, whereas the threads of the independent beams 46 pass through a row of eyelets 48 and then upwardly through sley 20.

As already mentioned above, guide bars 18 having threaded therethrough the warp threads 10, and the threads from the independent beams 46 are controlled by a Jacquard mechanism connected to the machine. With the help of this Jacquard mechanism the design or pattern of the tubular goods, for instance a lace stocking produced on the Leavers lace-making machine can be varied in infinite shapes and patterns, as may be desired. Parts of the Jacquard mechanism and their connection to the actual lace-making machine are shown in FIGS. 3 to 6.

With reference to these figures, the Jacquard comprises two cylinders 50 with seven so-called droppers 52 to a guide bar 18. The Jacquard is adapted to move the warp threads and independent beam threads 20 to the right or to the left any number of gaits, one gait being the distance between two adjacent carriages 15.

Cylinders 50 are hexagonal, one being provided for the front motion and the other for the back motion of the lace-making machine. Cylinders 50 are rotated alternately one-sixth of a complete revolution, and thus alternately control the two sets of droppers 52 of the front and back motions of the machine. Cylinders 50 are pierced from end to end on each face with seven rows of holes equally spaced as is well known in the art.

A dropper 52 is a steel pin with an enlarged head 54. The heads of droppers 52 are of six different sizes in conformity with a specified number of gaits. The first head, known as the "dummy" is longer than the others and is always working, since it is upon its upper part that the other droppers are bedded when raised; the lower part carrying an enlargement equal to half the distance between two carriages 15 (a half gait). The next dropper head is equal in thickness to one gait, the next to two, the next to four, the next to eight and the last sometimes to eight, sometimes to sixteen gaits. The further structure of the droppers need not be described here since it is well known in the lace-making art and is not essential to the description of the method and tubular article made in conformity with the present invention.

A series of cards 56 arranged in an endless chain are passed over the cylinders 50. Each card 56 lies temporarily passed over the upper flat side of cylinder 50. Each cylinder 50 has an up and down motion imparted thereon. Upon upward movement of the respective cylinder 50, its surface is replaced at each motion by the surface of a card 56 presenting either holes or a plain space, in conformity with the program punched into the respective card 56. If the space under a respective dropper 52 is punched, the dropper pin 60 will fall through the hole into the hollow cylinder 50, and this particular dropper is thereby placed out of action. If, on the other hand, a card 56 presents a plain space, the respective dropper 52 is raised by the portion of the card not punched out, and the head 54 of the respective dropper is raised into a bar box 62. It is to be understood that simultaneously all the droppers of a particular row of droppers are lifted where there is no hole in the card 56.

Figures 5, 6:
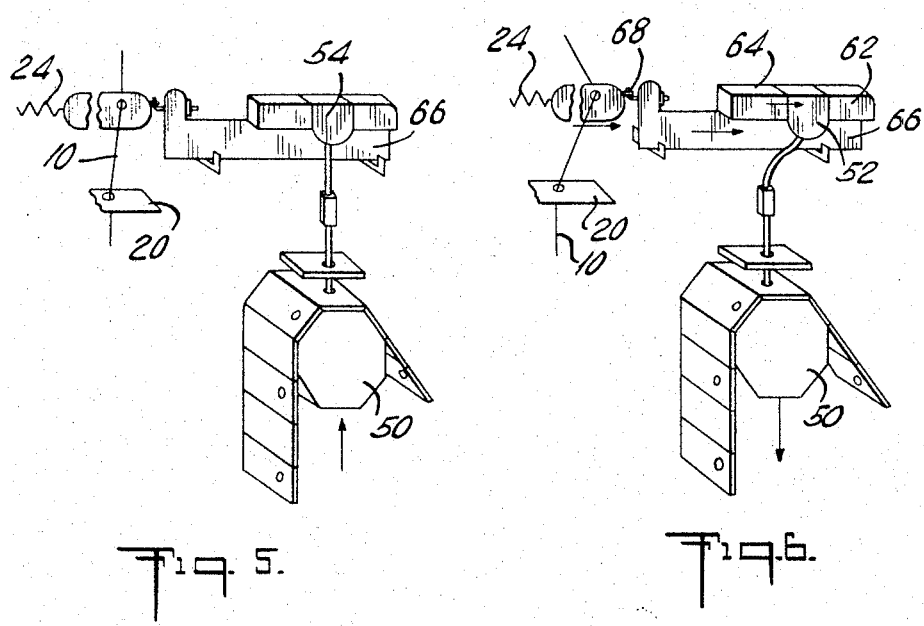

When, thereupon, a driving blade 64 moves forward as shown in FIG. 6, a metal bar 66 and thereby the respective guiding plate 24 attached thereto at 68, will likewise be moved forward to the extent of the sum of the sizes of the dropper heads 52 raised and trapped between blade 64 and box 62. Therefore, the bar 18 will be displaced laterally and the threads 10 therein will be moved likewise laterally throughout the length of the lace-making machine to the right or to the left according to the number of droppers 52 entrapped between driving plate 64 and bar box 62. If the one, two, and four gait droppers are raised, for example, the bar will move to the right by seven gaits above the so-called dead-stop, i.e. the lowest position of the respective bar 18. When the driving blade 64 is moved backward again, it releases the droppers 52 previously entrapped between the driving blade 64 and the bar box 62.

While the carriages 15 are at the extreme limit of their forward or backward motion, the Jacquard moves the bars 18 to the prearranged positions for each motion of the pattern, in conformity with the program punched on cards 56. When the guide bars 18 and thereby the threads 10 passed through the holes therein have reached the extremities of their movements, the carriages 15 will pass through to the opposite limit of their motion, the threads 10 will be tied in and the respective point bar 38 or 40 will pass through the threads, compress the twists and lift the same upwardly to beat them up against the finished work adjacent to roller 28.

Referring now to the diagrammatic sketches in FIGS. 7–12, these sketches show the general principle involved in the manufacture of tubular goods as, for instance, stockings, gloves and the like on a Leavers lace-making machine. It should be noted that the tubular material, for instance a stocking, has a front part and a back part which are manufactured on the Leavers lace-making machine at the same time without any seam or seams. In FIGS. 7–12 the warp threads of the front portion of the stocking are identified by reference characters F1, F2 and the warp threads of the back portion, for instance, by reference characters B1 and B2. Bobbin threads C1 and C2 are suspended between adjacent warp threads of the front and back portion. It is possible to assign adjacent warp threads alternately to the front and to the back portion, or as shown in FIGS. 7–12 to assign two adjacent warp threads to the front portion, the next two adjacent warp threads to the back portion, etc.

When the machine is started the bobbin threads C1, C2 are moved towards the front, as shown in FIG. 7. Subsequently the warp threads of the back portion are crossed (FIG. 8), any number of gaits towards the right or left as the pattern may require. For reasons of simplicity, it is assumed in FIGS. 7-12 that the warp threads are displaced by one gait only with respect to each other. Thereafter the bobbin threads C1 and C2 are moved towards the back by the mechanism shown in FIGS. 1 and 2. While the bobbin thread C1 can pass through the warp threads F1, F2 of the front portion unimpededly, the bobbin thread C2 is caught between warp threads B1, B2 of the back portion, as shown in FIG. 9.

In the next operation of the Leavers lace-making machine the warp threads F1, F2 of the front portion of the stocking are crossed (FIG. 10) while the warp threads B1, B2 of the back portion are returned to their original position. Consequently, upon the forward movement of bobbin threads C1, C2 bobbin thread C1 is caught at the intersection of warp threads F1, F2 while the bobbin thread C2 is twisted around the warp threads B1, B2 and tied thereto, thus completing a part of the pattern for the back portion of the stocking.

Subsequently, the warp threads F1, F2 are de-crossed by returning them to their original position (FIG. 12) so that upon backward movement of the bobbin threads in their respective carriages, bobbin thread C1 is twisted around warp threads F1, F2 in a manner similar to that described with reference to warp threads B1, B2 in FIG. 10.

While the general principle involved is illustrated in FIGS. 7-12 for just one pair of warp threads of the front and back portion of the stocking, it will be obvious to an expert in this field that this general principle can be extended to include any desired number of threads passed through the guide bars 18 of the Leavers lace-making machine.

A lace stocking may be produced in conformity with the program of FIG. 13, details being shown in FIGS. 14 to 17.

In FIG. 14, threads of the back portion, namely threads B1 and B2, can change position on either the front or back motion of the lace machine in conformity with the program punched on cards 56, and in relation to their assigned bobbin thread C2. Three are shown in FIGURE 14 for the back portion, one gait up or down, as for instance B2 from stops 2, 4 and 6 during the front motion of the lace machine, to stops 1, 3 and 5 during the back motions of the lace machine.

When changing position from stops 1 to 4 and from stops 3 to 6, as for instance threads B1 these threads necessarily cross bobbin threads C1 assigned to the front portion, FIGURE 15. When doing this they must change positions only on the front motions of the lace machine, that is, while carriages 15 are at their extreme travel to the front of the lace machine and during their period of rest in the front comb bar 16, FIGURE 2. After changing the desired amount in conformity with the program punched on cards 56, FIGURE 3, carriages 15 pass from the front comb bar 16 through threads F1 and F2 of the front portion (FIGURE 15) and engage threads B1 and B2 of the back portion (FIGURE 14) to comb bar 16 in the back of the lace machine for their next cycle.

Threads of the front portion (FIGURE 15), namely threads F1 and F2 can change position on either the front or back portion of the lace machine in conformity with program punched on cards 56 (FIGURE 3) and in relation to their assigned bobbin thread C1, three being shown in FIGURE 15, front portion, one gait up or down like thread F1 from stops 1, 3 and 5 during the front motion of the lace machine, to stops 0, 2 and 4 of the back motion of the lace machine.

When changing positions from stops 0 to 3 and from stops 2 to 5, as threads F2 in FIGURE 15, they necessarily cross bobbin thread C2 assigned to the back portion, FIGURE 14. When doing this, they must change positions only on the back motion of the lace machine, that is, while carriages 15 are at their extreme travel to the back of the lace machine and during their period of rest in the back comb bar 16, FIGURE 2. After changing the desired amount in conformity with the program punched on cards 56, FIGURE 3, carriages 15 pass from back comb bar 16 through threads B1 and B2 of the back portion, FIGURE 14, and engage threads F1 and F2 of the front portion, FIGURE 15, to comb bar 16 in the front of the lace machine for their next cycle.

FIGURE 16 shows front portion, FIGURE 15, on top or in front of back portion, FIGURE 15, making two individual pieces not jointed in any manner. For example, by joining front to back on one end of the lace machine, a 180 inch lace making machine could make a piece, when unfolded of 360 inches. When making gloves, stockings and leotards and the like, threads of the back portion are allowed to twist and engage bobbin threads C1 of the front portion, FIGURE 17, and threads of the front portion are allowed to twist and engage bobbin threads C2 of the back portion at a desired width. For example, to make a stocking of any length with a closed toe, the same cards 56 can be used to make leotards by adding the top piece from the top of the stocking to the waist. When doing this, threads B1 and B2 of the back portion are allowed to twist and engage bobbin thread C1 of the front portion, and threads F1 and F2 of the front portion are allowed to twist and engage bobbin thread C2 of the back portion at the extreme left and right of a pair of stockings. When the crotch is reached in the center of a pair of stockings, threads B1 and B2 of the back portion are allowed to return to their assigned bobbin threads C2. Threads F1 and F2 are allowed to return to their assigned bobbin thread C1, thereby making the panty top all in one piece, without seams from toe to waist. The same applies to gloves and the like.

Summarizing the basic principle involved, the bobbin threads become twisted around the warp threads of the front portion of the tubular goods during the forward movement of the bobbin threads whereas the bobbin threads become twisted around the warp threads of the back portion of the tubular goods during the backward movement of the bobbin threads. In this way the bobbin threads can move freely through the non-entangled warp threads of the front portion during the backward movement of the bobbin threads and can likewise pass freely through the unentangled warp threads of the back portion of the tubular goods during the forward movement of the bobbin threads. Where the front portion of the tubular body, for instance the stocking, joins the back portion thereof the warp threads are crossed during the front and back motion of the bobbin threads so that, at this point, the warp threads of both portions become intertwined to form one unitary seamless tubular body.

In conformity with a further feature of the present invention, it is possible to end the tubular portion of a specific article, for instance a stocking, at any desired point in order to close the same. Thus, if the stocking is to be manufactured, once the full length of the stocking has been reached, the warp threads of the front and back portion of the stocking are crossed during the front and back motion of the bobbin threads so that the foot portion of the stocking is formed, thus closing the stocking.

Similarly, gloves can be formed by joining the warp threads of the front and back portions at the fingers and at the ends. It will easily be understood that it is furthermore possible to manufacture leotards, bags and other similar items on the Leaver's lace making machine, in conformity with the present invention. More specifically, at the portions where the respective article is supposed to be tubular, the warp threads of the front portion are crossed during the back motion of the bobbin threads and the warp threads of the back portion are crossed during the front portion of the bobbin threads. However, where the particular article is supposed to be closed, i.e. in a stocking at the foot or in a glove at the end of the fingers and along the sides of the hand and fingers, the warp threads of the front and back portion are crossed during both the front motion and back motion of the bobbin threads.

The method according to the present invention is particularly suitable for stretchable yarns, since it is preferred to manufacture pieces of the same width over the entire length on such machines whereas most tubular goods do not have the same width throughout but have to adapt to different widths and cross sections, an obvious example being a stocking where the width at the ankle is smaller than at the calf.

What is claimed is:

1. A method of making a tubular seamless lace on a flat-bed lace-making machine from warp and bobbin threads comprising: assigning a first group of said warp threads to constitute the front portion of said tubular lace to be made, assigning a second group of warp threads to constitute the back portion of said tubular lace to be made, imparting a timed, preselected forward and backward movement of said bobbin threads and a timed, preselected crossing and decrossing movement of said warp threads to form an interlocking of said warp threads and bobbin threads, and crossing at least some of the warp threads of said first and second group between each forward and backward movement of said bobbin threads to tie the front and back portions together.

2. A method according to claim 1 wherein the warp threads of said front portion are crossed during the backward movement of the bobbin threads, and the warp threads of said back portion are crossed during the forward movement of the bobbin threads.

3. A method according to claim 1 wherein the warp threads of said front and back portions are crossed during both the forward and backward movement of said bobbin threads.

4. A method according to claim 1 wherein said tubular lace is a stretchable yarn, and the goods are of substantially the same width over the entire length thereof.

5. In a method of making a tubular seamless lace on a flat-bed lace-making machine from warp and bobbin threads, in conformity with a predetermined pattern the steps of: assigning a first group of said warp threads to the front portion of the tubular lace to be made and a second group of said warp threads to the back portion thereof, imparting a front motion to the bobbin threads, crossing the warp threads of said second group in conformity with the pattern, imparting a back motion to said bobbin threads whereby the same may pass freely through the warp threads of said first group and engage the crossed warp threads of said second group at their respective points of intersection, crossing the warp threads of said first group in conformity with the pattern and decrossing the warp threads of said second group, imparting a front motion to said bobbin threads whereby the same become twisted around the warp threads of said second group and engage the crossed warp threads of said first group at their respective points of intersection, crossing the warp threads of said second group in conformity of the pattern and decrossing the warp threads of said first group, imparting a back motion to the bobbin threads whereby the same become twisted around the warp threads of said first group and engage the crossed warp threads of said second group, repeating the four last-mentioned steps any desired number of times in conformity with the pattern, and tying together said first and second groups by crossing warp threads of said groups.

6. In a method according to claim 5, the steps of crossing at least some of the warp threads of said first and second group between each front and back motion of the bobbin threads to tie the front and back portion together.

7. A method according to claim 5, wherein adjacent warp threads are respectively alternately assigned to said first and second groups.

8. A method according to claim 5, wherein a plurality of adjacent warp threads are respectively alternately assigned to said first and second groups.

References Cited

UNITED STATES PATENTS

| | | | |
|---|---|---|---|
| 1,942,152 | 1/1934 | Sauer | 87—4 |
| 1,954,711 | 4/1934 | Oliver et al. | 66—178 XR |
| 2,164,749 | 7/1939 | Martin et al. | 87—4 |

JOHN PETRAKES, *Primary Examiner.*

66—195; 87—27

FO-1050
(5/69)

UNITED STATES PATENT OFFICE
CERTIFICATE OF CORRECTION

Patent No. 3,453,928      Dated July 8, 1969

Inventor(s) BYRON A. CROWE, ET AL

It is certified that error appears in the above-identified patent and that said Letters Patent are hereby corrected as shown below:

Column 7, line 19, cancel "flat-bed". Column 8, after line 35, insert the following claims:

9. A tubular seamless fabric of lace made on a lace-making machine from warp and bobbin threads in accordance with the method of claim 1.

10. A tubular seamless fabric of lace made on a lace-making machine from warp and bobbin threads in accordance with the method of claim 1 wherein said tubular lace is a stretchable yarn, and said tubular lace fabric is substantially the same width over the entire length thereof.

11. A tubular seamless fabric of lace made on a lace-making machine from warp and bobbin threads in accordance with the method of claim 1 wherein said fabric of lace forms a stocking.

12. A tubular seamless fabric of lace made on a lace-making machine from warp and bobbin threads in accordance with the method of claim 1 wherein said fabric of lace forms a leotard.

13. A tubular seamless fabric of lace made on a lace-making machine from warp and bobbin threads in accordance with the method of claim 1 wherein said fabric of lace forms a glove.

SIGNED AND
SEALED

MAR 24 1970

(SEAL)
Attest:

Edward M. Fletcher, Jr.
Attesting Officer

WILLIAM E. SCHUYLER, JR.
Commissioner of Patents